Patented June 20, 1939

2,163,498

UNITED STATES PATENT OFFICE 2,163,498

DETONATING COMPOSITIONS

Erich Scholz, Grotzingen, Germany, assignor to Deutsche Waffen- und Munitionsfabriken Aktiengesellschaft, Berlin-Charlottenburg, Germany, a joint-stock company of Germany No Drawing. Application August 24, 1937, Serial No. 160,673. In Germany June 4, 1937

7 Claims. (Cl. 52—2)

For the production of non-rusting and non-corroding priming or fulminating compositions, particularly priming compositions free from mercury, heretofore use has preferably been made of the so-called tetracenes, which when added to the usual composition components, for example to lead trinitroresorcinate, represent an excellent sensitising agent.

It has now been found that the above-mentioned tetracenes are not the only substances which may be employed for increasing the sensitivity of priming compositions, but that the same object may be attained by the use of highly nitrogeneus compounds.

According to the invention, the known diazotriazole carboxylic acid, which may be produced by diazotising amidotriazole carboxylic acid, is employed as initiating priming substance.

The starting product employed is amidotriazole carboxylic acid.

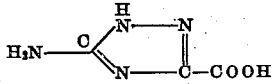

which, when treated with nitrous acid, gives an approximately quantitative yield of diazo-triazole carboxylic acid.

Diazo-triazole carboxylic acid is a new substance for the production of priming compositions and one which is capable of replacing mercury fulminate and the like explosives in priming compositions. The following mixing proportions will in general preferably come into consideration for the new priming compositions:

| | Percent |
|---|---|
| Lead styphnate | 30 to 60 |
| Diazo-triazole carboxylic acid | 1 to 10 |
| Antimony sulphide | 0 to 10 |
| Lead dioxide | 0 to 5 |
| Barium nitrate | 20 to 50 |
| Calcium silicide | 0 to 10 |

The following composition is proposed for example for percussion caps:

| | Percent |
|---|---|
| Lead styphnate | 30 |
| Diazo-triazole carboxylic acid | 5 |
| Antimony sulphide | 10 |
| Lead dioxide | 5 |
| Barium nitrate | 45 |
| Calcium silicide | 5 |

Diazo-triazole carboxylic acid increases the sensitiveness to percussion of a priming composition in an excellent manner if it is added in small quantities to the actual priming agents, such as lead trinitroresorcinate, barium trinitroresorcinate and the like.

I claim:

1. Priming compositions containing diazo-triazole carboxylic acid.

2. Priming compositions free from mercury compounds containing as a sensitising agent diazo-triazole carboxylic acid.

3. Priming compositions containing a small proportion, but not exceeding about 10%, of diazotriazole carboxylic acid.

4. Priming compositions containing diazo-triazole carboxylic acid in amounts of from about 1% to about 10%.

5. Priming compositions containing the following ingredients within the percentages specified: Lead styphnate, about 30 to about 60%; diazotriazole carboxylic acid, about 1% to about 10%; and barium nitrate, about 20% to about 50%.

6. Priming compositions containing lead styphnate, about 30 to about 60%; diazotriazole carboxylic acid, about 1% to about 10%; antimony sulphide, an amount not exceeding about 10%; lead dioxide, an amount not exceeding about 5%; barium nitrate, about 20% to about 50%; and calcium silicide, an amount not exceeding about 10%.

7. Priming compositions containing the following ingredients in substantially the proportions indicated: Lead styphnate, 30%; diazo-triazole carboxylic acid, 5%; antimony sulphide, 10%; lead dioxide, 5%; barium nitrate, 45%; calcium silicide, 5%.

ERICH SCHOLZ.